Oct. 19, 1965    W. J. BENCKERT    3,212,340
INERTIAL DOUBLE INTEGRATING ACCELEROMETER
Filed Nov. 29, 1963
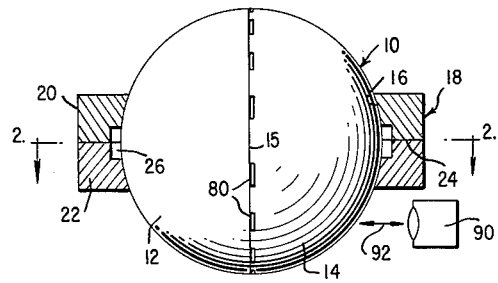
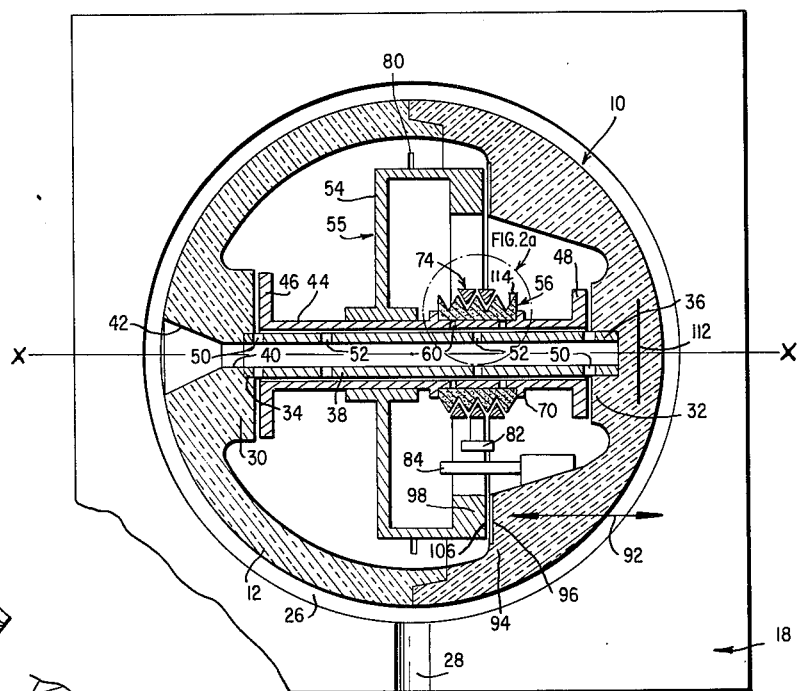
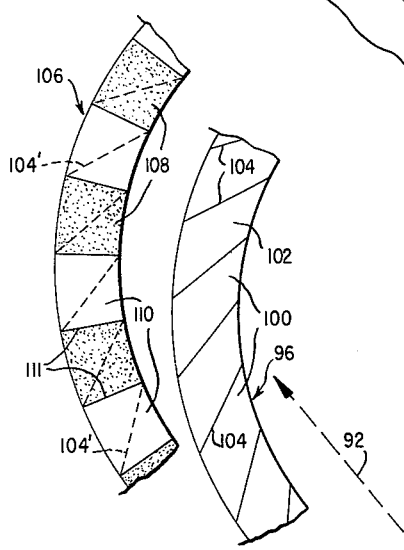
INVENTOR.
WILLIS J. BENCKERT
BY
Sughrue, Rothwell, Mion & Zinn
ATTORNEYS 
United States Patent Office 3,212,340
Patented Oct. 19, 1965

3,212,340
INERTIAL DOUBLE INTEGRATING
ACCELEROMETER
Willis J. Benckert, Glen Burnie, Md., assignor to Martin Marietta Corporation, New York, N.Y., a corporation of Maryland
Filed Nov. 29, 1963, Ser. No. 328,444
19 Claims. (Cl. 73—490)

This application is a continuation-in-part of my copending application Serial No. 207,661, filed July 5, 1962 and now abandoned.

This invention relates to an improved, inertial double integrating accelerometer and more particularly to an instrument of this type which is characterized by the apparent absence of frictional drag.

Accelerometers have one application in control systems arts for measuring the linear acceleration of a body in motion. In order to obtain maximum accuracy, many of the accelerometers are quite sophisticated; however, the sophistication is achieved at the sacrifice of economy. In the area of military missiles, especially those areas concerned with the delivery of non-nuclear pay loads in practical operations, both on land and at sea, where a high order of guidance position is required because of the smaller effective radii of the warheads, the cost of guidance must be balanced against the relatively small military effect of such warheads.

In all applications where indirect fire of a type which requires forward observation of targets and indirect determination of range and azimuth, for instance, in the order of 5 to 50 miles, the accuracy required should be such as to deliver the warhead within a few hundred of feet of the intended real target point. This accuracy must of course take into account such factors as observational mapping and instrument errors. Where direct, visual range observation is possible, ordinarily falling with a 2 to 10 mile range, the accuracy should be such that the fragmentation and blast effects are useful as well as chemical and incendiary effects which are considered most appropriate for the longer-range, indirect-fire case. Therefore, at these shorter ranges, accuracy in the over-all sense of less than 100 feet is highly desirable. Again, it must be stressed that this accuracy must be achieved at a cost commensurate with the warhead effect. In terms of economics, the order of a precision necessary must remain within a cost of a relatively few thousands dollars. In the case of conventional, sophisticated systems while they may provide the accuracy needed, the warhead effects is insufficient to justify the relatively high price of the guidance system.

Even with known, relatively simple and unsophisticated guidance systems which are economically feasible, their accuracy is questionable and necessarily the known devices are designed to ignore variable, such as winds and other atmospheric effects, including trail, cross-trail, drift, etc. It is equally evident that the use of non-lethal chemical (lachrymators, nauseators, psychogenics) and pyrochemicals (typically white phosphorous) against the many types of targets, such as air fields, troop and vehicle concentrations at the longer ranges, and fragmentation heads of modern, highly effective designs at the shorter ranges could have exceedingly great military effect if delivered within the required accuracy and at tolerable cost with a system of good reliability.

It is, therefore, a primary object of this invention to provide an improved, low cost, compact, linear accelerometer for use in such guidance systems having a minimum number of parts and having extremely high accuracy and reliability.

It is a further object of this invention to provide an improved, accelerometer of this type in which the moving parts are characterized by the apparent absence of frictional drag.

It is a further object of this invention to provide an improved, linear accelerometer of the double integrating type which is primarily a mechanical instrument.

It is a further object of this invention to provide an improved, mechanical, double integrating accelerometer which linearly transfers motion in inertial space to a self-contained inertial frame of reference, which has angular space stabilization, unlimited integration capacity, and almost complete suppression of viscous losses.

Further objects of this invention will be pointed out in the following detailed description and claims and illustrated in the accompanying drawing which discloses, by way of example, the principle of this invention and the best mode which has been contemplated of applying that principle.

In the drawing:

FIG. 1 is a top-planed view of one form of the present invention;

FIG. 2 is a side elevational view, in section, of the apparatus shown in FIG. 1 taken along lines 2—2;

FIG. 2a shows a portion of FIG. 2 on an enlarged scale;

FIG. 3 is a perspective view of a section of the annular, spaced, translucent, and opaque annuli forming a portion of the photoelectric sensing means associated with the apparatus of FIGS. 1 and 2.

In general, the apparatus of this invention comprises an assembly which includes a relatively stationary reference member and a screw member having an appreciable inertial mass which is supported on the stationary reference by a low viscosity fluid allowing the screw member to rotate about its axis with respect to the stationary member. Means are provided tending to rotate the screw member at a constant speed. A nut is threadedly positioned on the screw and means are provided for restraining rotary movement of the nut but allowing axial movement of the nut with respect to the screw. Any axial acceleration of the assembly tends to move the nut axially. Since the nut cannot rotate on the screw, the screw will, as a result, rotate with respect to the nut with the angular motion of the rotating screw deviating from the constant speed value.

In a preferred form, the longitudinally extending screw member is formed of a porous material and means are provided for creating a flow of low viscosity fluid through the porous member against the threads of the nut, whereby the nut is physically spaced from the screw providing an instrument with the apparent absence of frictional drag. To provide angular space stabilization, the screw member is supported for rotation within a hollow sphere by means including a low viscosity fluid. The hollow sphere itself is mounted for rotation about a common axis with the screw supported on a stationary reference support structure by means which also includes a low viscosity fluid. In addition to reducing the friction loss of the moving members, the hollow sphere and the screw are driven by means tending to rotate the members at a relatively high, constant speed with the conservation of angular momentum providing sufficient selfstabilization. Cooperating magnetic members, which are mounted in spaced relation on the nut and the inner surface of the sphere, act to restrain rotary movement of the nut but allow axial movement with respect to the rotating screw. A flywheel is mechanically coupled to the rotating screw and includes an annular section having contrasting surface portions which act in conjunction with a superimposed annulus framed on the hollow sphere, which has like contrasting surface portions of a slightly different pattern. These annuli cooperate with conventional photoelectric sensing means for determining the resultant difference in angular motion between the rotating screw member and the rotating sphere in response to linear acceleration of the assembly while simultaneously indicating whether the sphere is leading or lagging the flywheel assembly. At least one non-contrasting region is provided on the flywheel rim to provide speed-count data for recording purposes. The distance traveled along the assembly axis is determined by a comparison between a standard-frequency count with which the instrument is initially synchronized at zero flight speed, and the count delivered by the optical means in response to rotation of the assembly. The tendency of the wheel to lag or lead the sphere is prevented by driving means associated with the sphere such that the sphere tracks the motion of the inner wheel. The rotation of the sphere with respect to the position it would have had had its speed remained constant is a direct measure of the momentary location of the instrument along the linear axis of movement of the assembly.

Referring now to the drawing, there is shown in FIGS. 1 and 2 one form of the present invention including a hollow glass sphere 10 constructed of a pair of hemispheres 12 and 14 cemented at the equator 15. The glass sphere 10 is mounted in a spherical cavity 16 formed in a glass block 18. The rectangular glass block 18 is formed of two halves 20 and 22 attached at the medium surface 24. A peripheral groove 26 running completely around the spherical cavity supplies pressurized, low viscosity fluid from a source (not shown) at a pressure sufficient to float the sphere under rather high acceleration. The pressurized low viscosity fluid, which preferably is air, is delivered to the block through a vertical opening 28 at the bottom of the block 18 as indicated in FIG. 2. The hollow glass sphere 10 includes a pair of opposed, enlarged wall sections 30, about one axis indicated at X—X. The wall sections 30 and 32 include a pair of opposed coaxial bores 34–36 which act to receive respective ends of a tubular member 38. The ends of the tube 38 are fixedly engaged within the wall sections 30 and 32 such that the tube 38 may rotate with the sphere 10 about axis X—X. A reduced bore section 40 is provided immediately adjacent bore 34 and a tapered bore 42 extends therefrom to the outer surface of the hemisphere 12 at the axis X—X. As a result, pressurized, low viscosity fluid entering conduit 28 passes freely around the peripheral groove 26 into the conical bore 42 to the hollow axial tube 38. A second tubular member 44 of an inside diameter slightly in excess of the outside diameter of tube 38 is positioned concentric to the fixed tube 38 with the tubular member 44 acting as a freely rotatable shaft. The tubular member 44 includes a pair of rigidly directed end flanges 46 and 48, respectively, having end surfaces spaced slightly from the faces of the opposed wall sections 30 and 32. The tubular member 38 includes at either end thereof radial openings 50 for delivering pressurized low viscosity fluid to the gap between the faces of the respective members 30–46 and 32–48. These members, therefore, cooperate to provide thrust bearings tending to locate the outer tube or shaft 44 centrally of the fixed inner tube 38.

In like manner, additional radial openings 52 are formed at spaced points along the length of the inner tubular member 38 for directing pressurized fluid to the space between the concentric tubular members 38 and 44, thus providing a radial air bearing for the tubular member 44 extending throughout its length. The low viscosity fluid passing radially through openings 52 flows axially between the surfaces of these two members and escapes between the flanges 46 and 48 and the respectively reinforced wall portions 30 and 32 to aid in providing a thrust bearing action. A flywheel 54 of significant moment of inertial having any desirable configuration and preferably formed of a solid piece of metal is rigidly coupled to the freely rotatable shaft 44. The flywheel 54 is centrally located on shaft 44 for the purposes of providing dynamic and static balancing to the flywheel assembly 55.

The present invention is directed to the use of a porous screw member 56 which is also fixedly mounted on shaft 44 and therefore rotates is unison with the shaft and the flywheel. The screw member 56 is formed of a highly porous material such as porous metal or glass materials and includes a central bore 58 which is of a diameter generally equal to the outer diameter of the rotatable shaft 44. The type of porous metals suitable for use in this application are commonly referred to as sintered metals and are readily available in many different metals such as steel, copper, etc. One well known form of such a porous metal is the brass material which is subsequently oil impregnated to form "Oilite" bearings available from the Amplex Division of Chrysler Corporation, Detroit, Michigan.

The shaft 44 includes a number of randomly positioned radial openings 60 which act as fluid passageways for the low viscous fluid between the two tubular members 38 and 44 to a point where the pressurized low viscosity fluid contacts the inner surface or base 58 of the porous screw member. Since the member is porous, there is a tendency for the pressurized fluid to move radially outward through the screw. The viscous fluid would normally escape from the outer surface 62 of the screw in a more or less uniform manner depending upon the relative porosity of the different portions of the screw. It is desirable to have a uniform and controlled escapement of air. For this purpose, the outer surface 62 of the screw member is coated at 64 to prevent radial seepage of the pressurized fluid. It is to be noted that the coating covers all of the thread faces indicated at 66 as well as the end wall 68 to the point where the porous screw 56 abuts a pair of radial flanges 70 which act to prevent any axial shifting of the screw member with respect to the support shaft 54. In a preferred embodiment, the outer surface 62 of the porous thread member is coated or sealed by abrading this surface sufficiently to form the non-porous surface 64. However, alternate methods may be used such as effecting a deposit of metal in a thin layer to prevent the passage of air from the porous member.

In a preferred form, there is formed on each thread face 66 a radially extending slot 72 which extends through the coating to contact the outer surface 62 of the porous screw, allowing the pressurized low viscosity fluid to flow out of the porous screw in a regulated, radial manner.

In addition there is mounted or otherwise formed on the thread face 66 in the vicinity of one end thereof a stop 114 which serves a purpose which will be fully explained hereinafter.

A nut member 74 is mounted for rotation on screw member 56. The nut member 74 may be formed from helical wire having individual turns which are triangular in cross section. Each turn, therefore, has a pair of complementary thread faces 76 and a flat outer surface 78. The use of a helical wire having spaced turns allows the escape of fluid in a radial manner from the slots 72 against the opposed faces 76 of the thread member and along these faces, through the narrow slot between spaced turns and outwardly at an angle of 90° to the axis of shaft 44 and at right angles to the longitudinal axis of the helical nut, thereby preventing any tendency for the nut to move laterally as a result of unequal fluid flow. The parameters of the screw and nut threads are such that the nut, in response to the flow of pressurized fluid, is prevented from being in physical contact with the screw, except during the time it is being accelerated to a predetermined initial constant speed as will be later explained, and is thus supported upon a fluid or air cushion. Attached to the outer surface of the nut 74 is a permanent magnet 82 of relatively small mass which is coaligned and radially spaced from a ferrite bar member 84 fixed to the inner surface of the hollow spere 10.

It is apparent that the pressurized fluid escaping from the thrust bearings and also from the surfaces of the porous screw will pressurize the space not occupied within the hollow sphere 10. All air entering the sphere is exhausted through specially shaped jets 80 at the equatorial joint 15 in such a way that the sphere 10 rotates about the axis X—X. By controlling the pressure of the fluid stream entering conduit 28, the speed of the rotating sphere 10 may be varied to provide a desired reference speed. For example, the sphere 10 and its components may be rotated at a speed of 300 r.p.s. At this speed, the elements are given the stability of the instrument and is remarkably high. The angular momentum thus imparted establishes a reference direction for the sensitive axis X—X which is independent of motions of the vehicle frame 18 for 360° of pitch and and approximately plus or minus 10 to 15° yaw. The limitation as to yaw may be varied by the size of the axial port 42 supplying air to the inner assembly.

While the porous nut, as applied to the present invention, is shown as having a pair of opposed radial grooves 72 on opposed faces of the screw thread for directing a regulated flow of fluid against the thread faces 76 of nut 74, this means is only exemplary of one manner in which the flow of fluid through the porous member may be regulated. It is important that the grooves or slots be of equal cross-sectional area such that there is no net force acting on the faces 76 of the nut tending to move it in one direction or the other. For best results, the slot should be positioned at a point one-third to one-half way from the bottom land of the porous screw 56. The low viscosity, highly pressurized fluid issuing from the screw prevents any physical contact between the nut and thread and the screw. Since the only frictional restraint between these members is the fluid and since it is of such low viscosity, it is readily apparent that any axial force on the nut, for instance, would tend to spin it with respect to the screw at a relatively high velocity. In fact, unless some restraint is provided, a very small force would tend to spin the nut completely off the screw. In order to restrain this spinning effect, the magnetic means including the permanent bar magnet 82, and the ferrite bar 84 act to allow a slight axial movement of the nut with respect to the screw but prevent any rotation of the nut.

In the operation of the device, the highly pressurized, low viscosity fluid entering conduit 28 will support the hollow glass sphere 10 in spaced relation to the stationary support reference member 18, while the same fluid passing through fixed tube 38 will provide an air bearing for the flywheel assembly 55 including shaft 44, flywheel 54, porous screw 56, and the concentrically positioned solid metal nut 74. The escaping low viscosity fluid will tend to position the shaft 44 and its component elements centrally of fixed tube 38 by means of the thrust bearings, while the radial bearing formed between the concentric tubes 38 and 44 will allow free rotation of the flywheel assembly with respect to the tube 38 fixed to the sphere. The pressurized fluid escaping through specially formed jets 80 will rotate the sphere 10 and, as will be subsequently explained, the flywheel assembly 55 at relatively high initial speed to provide inertial stability to the rotating elements. The same angular velocity is experienced by all of the elements which rotate within the sphere 10. As a result of the flow of pressurized low viscosity fluid through the porous screw 56, the nut will be physically displaced from the screw and supported on its own air cushion.

If the instrument is now subjected to acceleration along the axis X—X, the mass of the nut 74 acting against the lead-angle of the screw thread face 66 will tend to rotate the porous screw member. Inherently, if the nut is prevented from rotating, its longitudinal movement must result in a rotation of the screw; likewise, if the nut is allowed to rotate, its rotary motion must necessarily result in a longitudinal movement of the screw. Since the nut is actually tending to rotate the porous screw member and since this member is phyically coupled to the remaining elements of the flywheel assembly 55, there will be a tendency to accelerate the wheel either to lag or to lead the speed of the spinning sphere. More specifically, acceleration along the X—X axis will tend to move the nut 74 axially thereby increasing the fluid pressure between one side of the thread faces 76 of the nut and one side of the thread faces 66 of the screw member 56 and decreasing the fluid pressure between the opposite sides of these members. This fluid pressure differential causes the screw member 56 to rotate. Means (not shown) are provided for driving the sphere by controlling the pressure of the air directed to conduit 28 and eventually to the exhaust jets 80 so that the sphere 10 will actually track the motion of the inner wheel 54. Thus, only very minute motions and relative velocities between the nut and screw and the wheel shaft and sphere are permitted, viscous dampening nearly disappears due to the low viscosity of the fluid and the very small motions and differences in velocity between the elements. As a result, the rotation of the sphere with respect to the position it would have had, had the sphere rotational speed remained constant at the initial value is a direct measurement of the momentary location of the instrument along the axis X—X.

In order to drive the sphere so as to track the motion of the inner wheel which varies as a result of acceleration along the sense axis X—X, means must be provided for sensing the relative position of the sphere and the wheel. The present invention provides an extremely advantageous optical method for sensing the tendency of the sphere 10 to lag or lead the wheel, as well as a means for putting in the time count of the rotating sphere. As shown schematically in FIG. 1, an optical assembly 90 is located so that it can "see" through the hollow glass sphere 10, the light passing in both direction as indicated by arrows 92 in FIGS. 1 and 2. An annular flange 94 is formed within semispherical section 14 with the annular flange including a flat annular surface or face 96 which is positioned adjacent an annular section 98 of the flywheel 55 but spaced slightly therefrom. The surface 96 of the sphere is formed with an alternating grid of red and green filters whose edges are 45° to the radii and have a desired pitch. Referring to FIG. 3, there is shown is perspective the annular flat surface 96 of the clear glass hemisphere 14 with alternate red filter sections 100 and alternate green filter sections 102. The lines of demarcation 104 are shown to be at 45° to the radius of the annulus. Immediately behind the surface 96 of the glass sphere and spaced slightly therefrom is the frontal surface 106 of the opaque flywheel annulus 98. The surface 106 is fitted with a grid of black and white alternating squares whose pitch is the same as the alternating filter grid formed on annular surface 96 but the lines of demarcation are on the radius. Thus, the black sections 108 are spaced by the white sections 110. It is readily apparent, therefore, that although the wheel assembly 55 is free to rotate with respect to the sphere 10, in one position the light ray 92 in passing through the translucent filter grid annulus will cause all of the white squares 110 to reflect identical areas of red and green light from the white area as indicated by the superposition of the demarcation lines 104 on the white sections 110, as indicated by dotted lines 104'. Two separate photosensors (not shown) are positioned within the optical assembly 90 behind the red and green filters to analyze the reflected light. The light is more red or more green as the sphere leads or lags the wheel, and the imbalance is suitably amplified by means (not shown) to generate speed control signals for varying the pressure of the fluid of the low viscosity fluid delivered to conduit 28 for controlling the speed. Thus, as a result of any acceleration along the axis X—X, there will be a tendency for the line of demarcation 104' to shift on the white square 110 since there will be a difference in annular speed between the sphere 10 carrying the annulus 96 and the wheel 55 carrying the opaque annulus 106. A shift in either direction will result in an instantaneous increase or decrease in the pressure of the fluid flow to conduit 28 to increase or decease the speed of rotation of the sphere 10 so as to bring it back into synchronism with the wheel assembly 55, thereby acting to realign the line of demarccation 104′ so as to provide equal areas of reflected green and red light. In addition to the alternate black and white grids, there may be provided one or more all-black regions on the surface of the wheel rim 196. In a preferred form, four all-black regions exist so that four cycles per revolution of speed-count data are available for recording purposes. The use of the optical system shown including the photosensing means allows extremely high rotary speed to be provided for the rotating sphere 10. The only limitation is the response time of the photocell. As mentioned above, a speed of 300 cycles per second provides efficient stabilization of the instrument while delivering adequate speed-count data.

As previously explained the initial pressure of fluid escaping from the specially shaped jets 80 causes the sphere 10 to rotate at a predetermined initial constant speed. The magnetic coupling between the nut member 74 and the sphere 10, consisting of the permanent magnet 82 and the ferrite bar member 84, will cause the nut member to rotate at the same speed as the sphere. Initially the nut 74 will start to rotate off of the porous screw member 56 which is still at rest. However, the nut 74 will eventually contact the stop 114 and the force therebetween will cause the screw member 56 and the tubular member 44 on which it is mounted to rotate at the same speed as the nut. As the rotating speed of the screw member 56 and the nut 74 reach the predetermined initial constant speed, the optical assembly 90 senses the lag of the flywheel 54 and adjusts the pressure of the air directed to conduit 28 and eventually to the exhaust jets 80 to cause the sphere 10 and the nut member 74 magnetically coupled thereto to track the motion of the flywheel. This action causes the nut member 74 to move out of contact with the stop 114 on the screw member 56 and to position itself with respect to the screw member such that there is an equal fluid pressure between the various thread faces 76 of the nut member and the thread faces 66 of the screw member. At this point the entire assembly of sphere 10, flywheel 54, tubular member 44 and nut member 74 rotate at the same predetermined initial constant speed about the X—X axis with no physical contact between the screw member 56 and the nut member.

The sphere is initially brought into synchronism with a standard-frequency generator (not shown) while at rest, aligned by a leveling loop and precessed in azimuth by air jets until the mirror 112 which is fixedly positioned at right angles to the axis X—X is normal to a collimator (not shown). The standard-frequency generator counts into a binary register (not shown) in flight, and the black-white count received from the optical sensing assembly 90 is used to count out. The net count remaining is thus proportional at all times to the linear distance made good along the axis X—X. A fixed position of the optical sensing assembly 90 is satisfactory for at least 135° of total pitch of the air frame about the transverse axis. Preferably, all interior surfaces of the sphere 10 other than the surface 96 should be blackened, so that the color-quality of the light and its pulsation for count are not unduly unmasked.

While in the preferred embodiment, the screw member is porous and the nut member is solid, it is envisioned that the alternate arrangement in which the nut member is porous and the screw member is solid would provide an accelerometer which would operate in an equally highly efficient manner. At the same time, means in the preferred embodiment have been employed for restraining rotary movement of the helical wire nut member while allowing limited axial movement thereto. It is also envisioned that a device in which the nut member is allowed to rotate slightly but is prevented from axial movement would provide an accelerometer operating under the same principle as the preferred device. Of course, this would result in an axial shift of the screw with respect to the rotating sphere, with the amount of shift or tendency to shift being indicative of the axial acceleration experienced by the inertial device.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

The invention claimed is:

1. An accelerometer assembly comprising a relatively stationary reference member, a screw member, means for mounting said screw member for rotation about its axis with respect to said stationary member and to permit free movement of said screw with respect to said stationary member about at least one other axis perpendicular to said axis, means tending to rotate said screw member at an initial constant speed, a nut member threadedly positioned on said screw member whereby longitudinal movement of said nut member tends to rotate said screw member and rotary movement of said nut member tends to move said screw member axially, means for restraining one type of movement of said nut member with respect to said screw member but allowing the other type of movement thereto whereby axial acceleration of said assembly tends to move said nut member with respect to said screw member with resultant change in position or angular movement of said rotating screw member.

2. An accelerometer assembly comprising: a relatively stationary reference member, a screw member having appreciable inertia mass, means for mounting said screw member for rotation about its axis with respect to said stationary member and to permit free movement of said screw with respect to said stationary member about at least one other axis perpendicular to said axis, means tending to rotate said screw member at an initial constant speed, a nut member threadedly positioned on said screw member and means for restraining rotary movement of said nut member on said screw member but allowing axial movement thereto whereby axial acceleration of said assembly tends to move said nut member axially with resultant change in angular motion of said rotating screw member.

3. A low friction accelerometer comprising a relatively stationary reference, a longitudinally extending screw member having appreciable inertia mass, low viscosity fluid support means for mounting said screw for rotation about its axis with respect to said stationary reference and to permit free movement of said screw with respect to said stationary reference about at least one other axis perpendicular to said axis, a nut member threadedly mounted on said screw member for rotation thereto, one of said members being formed of porous material, means for creating a flow of low viscosity fluid through said porous member and against the threads of said other member whereby said members are physically spaced from each other by said moving fluid, means tending to rotate said screw member at an initial constant speed, and means for restraining rotary movement of said nut on said screw but allowing axial movement thereto whereby axial acceleration of said assembly tends to move said nut member axially with resultant change in angular motion of said rotating screw.

4. A low friction accelerometer assembly comprising: a stationary reference member, a longitudinally extending screw formed of porous material and having appreciable inertia mass, a low viscosity fluid support means for mounting said screw for rotation about its axis with respect to said stationary reference member and to permit free movement of said screw with respect to said stationary reference member about at least one other axis perpendicular to said axis, means tending to rotate said screw at an initial constant speed, a solid nut threadedly mounted on said screw for rotation thereto, means for causing a flow of low viscosity fluid through said porous screw and against the threads of said nut whereby said nut is physically spaced from said screw by said moving fluid, and means for restraining rotary movement of said nut on said screw but allowing axial movement thereto whereby axial acceleration of said assembly tends to move said nut axially with resultant change in angular motion of said rotating screw.

5. An accelerometer assembly comprising: a relatively stationary reference, a hollow sphere, means for supporting said sphere on said stationary reference for rotation about a first axis of said sphere and to permit free movement of said sphere with respect to said stationary reference about at least one other axis of said sphere perpendicular to said first axis, a screw member including a flywheel having appreciable inertial mass, means for mounting said screw member for rotation within said sphere about its axis and said first axis of said rotating sphere, means tending to rotate said sphere and said screw member about said common first axis at an initial constant speed, a nut member threadedly positioned on said screw member, and means for restraining rotary movement of said nut member on said screw member but allowing axial movement thereto whereby axial acceleration of said assembly tends to move said nut member axially with a resultant difference in angular motion between said rotating screw member and said rotating sphere.

6. Apparatus as claimed in claim 5 wherein said restraining means include a permanent magnet fixed to said nut member and a ferromagnetic bar spaced slightly from said permanent magnet in a radial direction and fixed to said sphere.

7. Apparatus as claimed in claim 5 further including means for indicating the difference in angular motion between said screw member and said sphere.

8. Apparatus as claimed in claim 7 wherein said hollow sphere is translucent and said means for indicating a difference in angular motion between said flywheel and said sphere comprise: an annular surface formed on said rotating sphere having alternate filter sections of contrasting colors, said flywheel including a superpositioned opaque annular section including alternate segments of equal pitch to said first annulus having reflecting and non-reflecting characteristics and having lines of demarcation offset with respect to the lines of demarcation between the filter sections of said first annulus, means for passing reflected light from said opaque annular section through said translucent annular section, and optical means for measuring the difference in quantity of reflected light of said two contrasting colors from said reflective surface portions of said flywheel.

9. An improved, low friction accelerometer assembly comprising: a relatively stationary reference, a hollow sphere, means including a low viscosity fluid for supporting said sphere on said stationary reference for rotation about a first axis thereof and to permit free movement of said sphere with respect to said stationary reference about at least one other axis of said sphere perpendicular to said first axis, a screw member having appreciable inertial mass, low viscosity fluid support means for mounting said screw member for rotation within said sphere about its axis and said first axis of said rotating sphere, means tending to rotate said sphere and said screw member about said common first axis at an initial constant speed, a nut member threadedly positioned on said screw member, and means for restraining rotary movement of said nut member on said screw member but allowing axial movement thereto whereby axial acceleration of said assembly tends to move said nut member axially with a resultant difference in angular motion between said rotating screw member and said rotating sphere.

10. An improved, low friction accelerometer assembly comprising: a stationary reference member, a hollow sphere, means including a low viscosity fluid for supporting said sphere for rotation about a first axis of said sphere and to permit free movement of said sphere with respect to said stationary reference member about at least one other axis of said sphere perpendicular to said first axis, a longitudinally extending screw member formed of porous material, means including a low viscosity fluid for supporting said screw member within said sphere for rotation about said first axis, means tending to rotate said sphere and said screw member about said first axis at constant initial speed, a nut member threadedly positioned on said screw member, means for causing a flow of low viscosity fluid through said porous screw member against the threads of said nut member whereby said nut member is physically spaced from said screw by said moving fluid, and means for restraining rotary movement of said nut member on said screw member but allowing axial movement thereto whereby axial acceleration of said assembly tends to move said nut member axially with a resultant difference in angular motion between said rotating screw member and said rotating sphere.

11. An improved, low friction accelerometer assembly comprising: a stationary reference member, a hollow sphere, means including a low viscosity fluid for supporting said sphere for rotation about a first axis of said sphere with respect to said stationary reference member and to permit free movement of said sphere with respect to said stationary reference member about at least one other axis of said sphere perpendicular to said first axis, a longitudinally extending screw member formed of a porous material, a solid nut member threadedly positioned on said screw member, low viscosity fluid support means for mounting said screw member within said sphere for rotation about its axis and said first axis of said rotatable sphere, a flywheel coupled to said screw member and positioned within said hollow sphere for providing inertial mass, said porous screw member including a throughbore and sealed outer thread surfaces to prevent radial passages of low viscosity fluid therethrough, openings of equal cross-sectional area formed within respective faces of said screw thread, means for delivering pressurized, low viscosity fluid to said throughbore whereby said fluid passes radially through said porous screw member and escapes through said slots against the threads of said nut member to physically space said nut member from said screw member by said moving fluid, means tending to rotate said sphere, said screw member, said wheel, and said nut member at an initial constant speed, and means for restraining rotary movement of said nut member on said screw member but allowing axial movement thereto, whereby axial acceleration of said assembly tends to move said nut member axially with a resultant change in angular motion of said rotating screw member and wheel with respect to said rotating sphere.

12. Apparatus as claimed in claim 11 said restraining means include a permanent magnet fixed to said nut member and a ferromagnetic bar spaced slightly from said permanent magnet in a radial direction and fixed to said sphere.

13. Apparatus as claimed in claim 11 further including means for indicating the difference in angular motion between said flywheel and said sphere.

14. An improved, low friction accelerometer assembly comprising: a stationary reference member, said stationaary reference member including a hollow block having an annular opening formed centrally thereof, an annular groove of larger diameter than said annular opening formed centrally of said block, a hollow sphere positioned within said annular opening for free movement with respect to said stationary reference member about at least two perpendicular axes of said sphere, a first hollow tube axially positioned within said hollow sphere and fixed thereto, means including an opening formed within said hollow sphere to provide fluid communication with said annular groove and said first hollow tube within said hollow sphere, a flywheel assembly including a second concentric tube mounted upon said first tube for free rotation thereabout, spaced openings within said first tube to provide fluid communication between said first tube and said second tube, a porous screw rigidly coupled to the outer surface of said second tube and having a sealed outer surface, communicating passages formed radially within said second tube for placing said porous screw in fluid communication with the interior of said second tube, a solid nut threadedly positioned on said screw, means for restraining rotary movement of said nut on said screw, but allowing axial movement thereto, at least one exhaust jet formed within said hollow sphere equatorially thereof for allowing said pressurized fluid to exhaust from said hollow sphere and means for causing a flow of low viscosity fluid through said annular groove of said block, said first tube, said second tube, said porous screw and against the thread of said nut for subsequent exhaust through said exhaust jet whereby said assembly is rotatably driven about one of said perpendicular axes of said sphere and axial acceleration of said assembly tends to move said nut axially on said screw with a resultant difference in angular motion between said flywheel assembly and said rotating sphere.

15. A double-integrating accelerometer assembly comprising: a relatively stationary reference, a first rotating member mounted for rotation with respect to said stationary reference about its axis and to permit free movement of said rotating member with respect to said stationary reference about at least one other axis perpendicular to said axis, a second rotating member positioned on said first rotating member for rotation thereto, said second rotatable member including a longitudinal screw having appreciable inertial mass, a nut threadedly positioned on said screw member for rotation thereto, means for restraining rotary movement of said nut on said screw but allowing axial movement thereto, means tending to rotate said first rotatable member and said second rotatable member and said second rotatable member at an initial constant speed whereby axial acceleration of said assembly tends to move said nut axially with resultant difference in angular motion between said first rotating member and said second rotating member, means responsive to said resultant difference in angular motion for varying the speed of rotation of said first member to eliminate the resultant difference in angular motion, and means for determining the difference in angular motion of said first member over a period of time and the angular motion that would have occurred had said first and second members continued to rotate at said initial constant speed.

16. Apparatus as claimed in claim 15 wherein said first rotary member, said second rotary member and said nut are supported within said assembly by means including a low viscosity fluid.

17. Apparatus as claimed in claim 15 wherein said screw is of a porous material and means are provided for creating a flow of low viscosity fluid through said porous screw member against the threads of said nut whereby said nut and said screw are physically spaced from each other by said moving fluid.

18. A low friction accelerometer assembly comprising: a stationary reference member, a longitudinally extending screw formed of porous material and having appreciable inertia mass, a low viscosity fluid support means for mounting said screw for rotation about its axis with respect to said stationary reference member, means tending to rotate said screw at an initial constant speed, a nut formed from helical wire threadedly mounted on said screw for rotation thereto, means for causing a flow of low viscosity fluid through said porous screw and against the threads of said nut whereby said nut is physically spaced from said screw by said moving fluid, and means for restraining rotary movement of said nut on said screw but allowing axial movement thereto whereby axial acceleration of said assembly tends to move said nut axially with resultant change in angular motion of said rotating screw.

19. An accelerometer assembly comprising: a relatively stationary reference, a hollow sphere, means for supporting said sphere on said stationary reference for rotation about one axis of said sphere, a screw member including a flywheel having appreciable inertial mass, means for mounting said screw member for rotation within said sphere about its axis and the axis of said rotating sphere, means tending to rotate said sphere and said screw member about said common axis at an initial constant speed, a nut member formed from helical wire threadedly positioned on said screw member, and means for restraining rotary movement of said nut member on said screw member but allowing axial movement thereto whereby axial acceleration of said assembly tends to move said nut member axially with a resultant difference in angular motion between said rotating screw member and said rotating sphere.

References Cited by the Examiner
UNITED STATES PATENTS

| 2,855,249 | 10/58 | Gerard. | |
| 3,056,303 | 10/62 | Naylor | 73—516 X |
| 3,066,540 | 12/62 | Severance | 73—490 |
| 3,104,496 | 9/63 | Macks | 308—9 |
| 3,122,023 | 2/64 | Gledhill | 73—490 |
| 3,129,592 | 4/64 | Bracutt | 73—490 |
| 3,148,547 | 9/64 | Angele | 73—490 |

RICHARD C. QUEISSER, *Primary Examiner.*

JAMES J. GILL, *Examiner.*